Feb. 11, 1936.  J. S. LUNDGREN  2,030,706
MILK BOTTLE WEIR
Filed Feb. 1, 1935
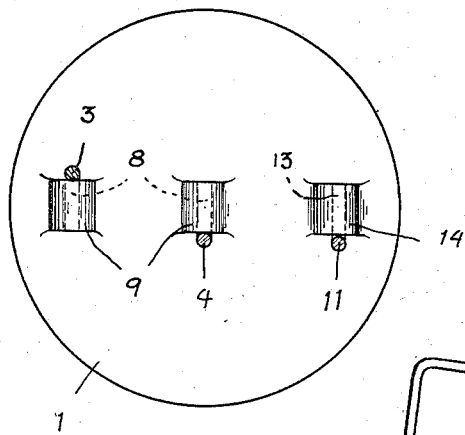
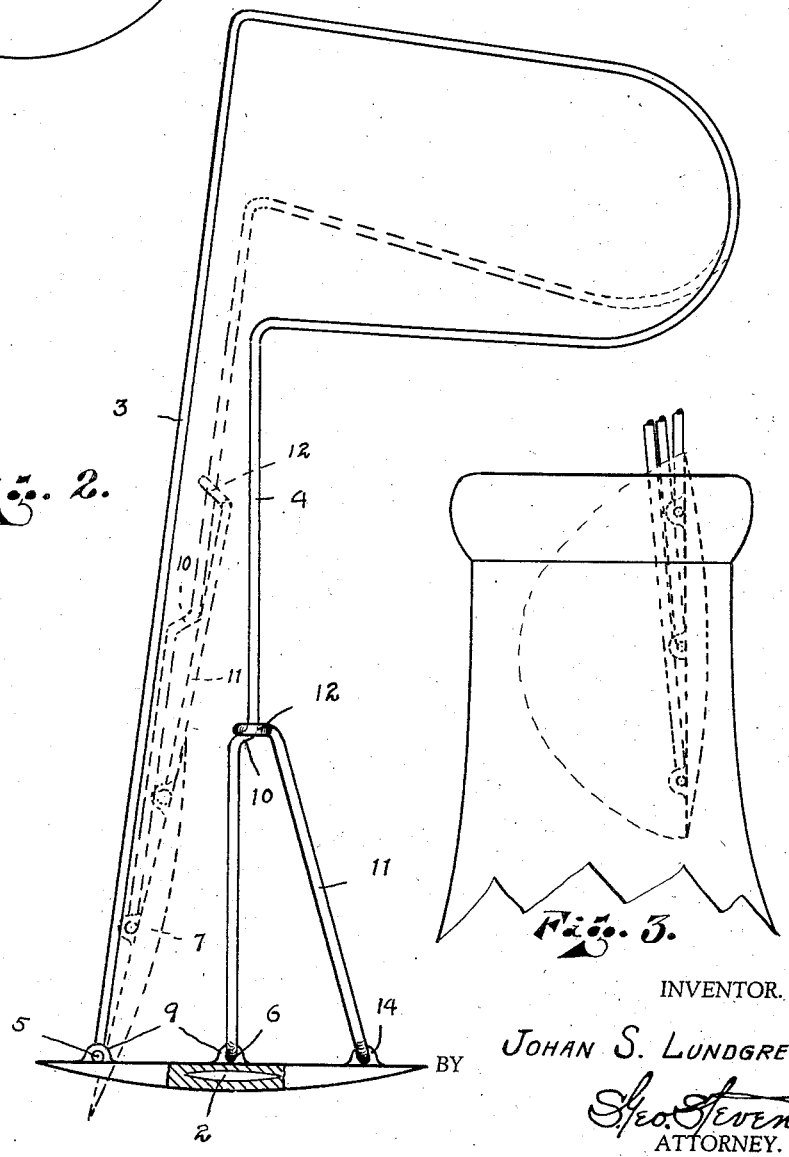
INVENTOR.
JOHAN S. LUNDGREN
BY
Geo. Stevens
ATTORNEY.

Patented Feb. 11, 1936

2,030,706

UNITED STATES PATENT OFFICE 2,030,706

MILK BOTTLE WEIR

Johan Samuel Lundgren, Superior, Wis.

Application February 1, 1935, Serial No. 4,516

7 Claims. (Cl. 210—51.5)

This invention relates to milk bottle weirs or portable dams for insertion within the neck of a milk bottle for separating the milk from the cream to permit of the latter being readily poured from the bottle without in any way affecting or commingling the former.

The principal object of the invention is to produce a more practical device of this character than heretofore known.

Another object is to provide means whereby the uniformity of action in the matter of insertion as well as withdrawal of the device is assured.

This application is a continuation-in-part of my formerly allowed application Serial Number 683,448, and retains all of the novel advantages therein set forth, and the added advantage that means is provided in combination therewith whereby the weir, after being inserted within a bottle to the proper depth and pressure upon the handle released it will return always to a horizontal position; this forming a further object of the invention.

Still other objects and advantages of the invention will appear in the following description thereof.

Referring now to the accompanying drawing, forming part of this application, and wherein like reference characters indicate like parts:

Figure 1 is a top plan view of the rubber disc which forms the weir or dam, and showing the arms of the handle in section.

Figure 2 is a side elevation of the completely assembled device.

Figure 3 is a side elevation of the neck of a common milk bottle with the weir partly inserted therein.

I am aware that quite similar devices have been patented but as above stated the novel features of the present invention are deemed to have marked advantages over those previously employed, and which will be pointed out later.

1 represents the weir or dam which is composed of soft pliable rubber, it being preferably flat on top and convex on the bottom, terminating in a thin edge circumferentially, and, if desired, may be provided with a central circular air chamber 2 to assist in the disc normally assuming an uppermost position in the milk to which it is applied as well as making the disc more readily yieldable when in the partially folded position necessary for it to pass through the neck of the bottle.

3 and 4 represent the arms of the spring wire handle, the latter being of suitable size for being conveniently grasped in the hand. The arms are novel in that the one indicated at 3 forms the rigid or straight arm, which is pivotally mounted as at 5 intermediate of the center and edge of the disc 1, while the other or adjustable arm 4 is pivotally attached as at 6 to the disc 1 exactly in the center thereof. It is to be understood that for the proper novel functioning of the device it is very essential that the arm 4 be pivotally attached to the disc at a point centrally thereof, as, if such were not the case, the disc when adjusted to its tipped position as indicated in dotted lines at 7, Figure 2, would fail in having one edge in a leading position and of less resiliency than the other edge for entrance into the bottle neck. But when the handle is mounted as illustrated and described it assures ready and most convenient application of the disc, thus tipped, into the neck of a bottle, without application of the fingers of the hand to initially shape the disc for such entrance, which, obviously, is an unsanitary procedure.

It will further be noted that when the loop of the handle is tightly pinched, or at least slightly more than what is illustrated in dotted lines, tending to separate the pivotal points of the two arms or displace them beyond their normal spaced relation, the upper and lower marginal edges of the disc will tend to contract inwardly towards each other which further assists materially in hugging the inside of the bottle when entering same in the act of getting around and below the volume of cream.

The lowermost ends of the arms 3 and 4 are bent at right angles in opposite directions forming horizontal parallel pintles as at 8 for entrance through the holes in the upstanding lugs 9 of rubber and formed integral with the disc, so that the same will readily slip out of the lugs or into same for cleansing purposes. With this arrangement of arm attachment to the disc it is quite obvious that when an operator pinches the handle tightly thereby advancing the arm 3 downwardly beyond the arm 4, and tipping up the disc, it is ideally positioned for thrusting into the neck of the bottle, as well as hugging one side of the bottle to circumvent the body of the cream, and when once below same the natural tendency of the fingers of the hand is to raise the disc, and the fingers adjacent the upper end of the arm 4 will bring the stress upwardly in the most desirable manner possible from the center of the disc, as the arm 4 is there attached.

The pintles 8 of the arms of the handle being formed in opposite directions provide convenient means to prevent the disc from having too free dislodgment from the arms as might accidentally occur.

It will thus be evident that I have produced an exceedingly simple and practical device for the separation of the cream and milk and one which is easily inserted within the neck of a bottle, passed downwardly around the circumferential wall of the body of cream, and then brought transversely of same and upwardly until the rubber disc becomes sealed against the edges of the bottle, permitting of the latter being readily tipped until the cream is all poured off without the least amount of milk passing out with the cream.

To more positively insure that, after the weir has been inserted and passed downwardly around the circumferential wall of the body of cream, the weir will assume a horizontal position under the cream, I have formed in the arm 4 a slight kink or bend as indicated at 10, and provided the short arm 11, at the upper end of which is formed an eye 12 encircling the arm 4 above the kink. The lower end is bent over at right angles forming a pintle 13, similar to the pintles 8, and which pintle is insertable within another lug 14 formed on the upper surface of the weir near the circumference thereof, as indicated in Figures 1 and 2. When the arms are displaced to tip up the weir, the short arm 11 simply slides upwardly on the arm 4, but when pressure on the handle is released and the arms return to normal, the leg 11 can slide downwardly on the arm 4 no farther than the kink and in which position the weir is maintained at substantially right angles to the arm 4, and thus it becomes practically impossible to position the weir under the cream in a milk bottle in any position other than horizontal.

Having thus described my invention, what I claim and desire to secure by Letters Patent, is:

1. A milk bottle weir comprising a flexible disc, arm receiving lugs extending from one side of the disc, one located at the center of the disc and another intermediate of the center and circumferential edge thereof, said lugs having parallel holes therethrough at right angles to the axis of the disc, a handle formed of a single piece of spring wire bent intermediate of its ends and having two substantially parallel spaced arms bent at substantially right angles to the handle and terminating in oppositely disposed right angular pintles for engagement within the holes in said lugs, whereby when the handle is squeezed the arms are displaced rotating the disc to a position permitting convenient insertion within the neck of a bottle.

2. A milk bottle weir of the class described comprising a circular disc having a flat top and a convex bottom, lugs having openings therein formed integral with the top of the disc, one of which is in the center thereof, and a manipulating handle comprising a spring wire having normally divergent straight free end portions terminating in oppositely disposed pintles engaged in said lug openings and a right angularly disposed U-shaped handle portion, and means whereby upon squeezing said U-shaped portion the free ends of the handle are displaced rotating the disc to a position permitting convenient insertion within the neck of a bottle.

3. A milk bottle weir comprising a flexible disc and a spring wire handle having a pair of depending arms terminating in oppositely disposed pintles connected to the disc for operating same, and said wire being looped in spaced relation at substantially right angles to said arms, whereby upon squeezing said looped portion the arms are displaced rotating said disc to a position for convenient insertion within the neck of a bottle.

4. A flexible weir having spaced lugs thereupon provided with holes therethrough, a handle for said weir comprising a length of wire bent intermediate its ends forming a loop, the ends of the wire being bent at substantially right angles to the looped portion forming manipulating arms, the ends of said arms being inserted within a pair of said lugs, a stop formed in one of said arms and means slidable upon said arm above the stop and attached to another lug to normally maintain said weir at substantially right angles to said arm.

5. A milk bottle weir comprising a flexible disc having means for attaching a handle thereto, and a spring wire handle having depending arms the free ends of which are attached to said disc and said handle being bent intermediate its ends at substantially right angles to said arms to form an operating handle, a stop formed on one of said arms and means slidable upon said arm above the stop and attached to said disc to normally maintain said disc at right angles to said arm.

6. A milk bottle weir comprising a flexible disc having means for attaching a handle thereto, a spring wire bent intermediate of its ends to form an operating handle and having depending arms bent at substantially right angles to the handle the free ends of which are attached to said disc, a stop on one of said arms, and means one end of which slidably encircles said arm above the stop and the other end of which is attached to said disc to normally maintain said disc at right angles to said arm.

7. A milk bottle weir comprising a flexible disc having means for attaching a handle thereto, a spring wire bent intermediate of its ends forming a handle, the free ends thereof being bent at substantially right angles to the handle and the ends of said arms being attached to said disc, a bend in one of said arms forming a stop, and a relatively short arm one end of which slidably encircles said arm above the stop and the other end of which is attached to the disc to normally maintain said disc at right angles to the arm having the bend therein.

JOHAN SAMUEL LUNDGREN.